Sept. 9, 1952 W. HESCH, SR 2,609,703
TRANSMISSION-DIFFERENTIAL ASSEMBLY
Filed July 23, 1951 4 Sheets—Sheet 1

William Hesch, Sr.
INVENTOR.

BY *Clarence A. O'Brien*
*and Harvey B. Jacobson*
Attorneys

William Hesch, Sr.
INVENTOR.

Sept. 9, 1952 W. HESCH, SR 2,609,703
TRANSMISSION-DIFFERENTIAL ASSEMBLY
Filed July 23, 1951 4 Sheets-Sheet 3

William Hesch, Sr.
INVENTOR.

Sept. 9, 1952  W. HESCH, SR  2,609,703
TRANSMISSION-DIFFERENTIAL ASSEMBLY
Filed July 23, 1951  4 Sheets-Sheet 4

William Hesch, Sr.
INVENTOR.

Patented Sept. 9, 1952

2,609,703

UNITED STATES PATENT OFFICE 2,609,703

TRANSMISSION-DIFFERENTIAL ASSEMBLY

William Hesch, Sr., Santa Fe, N. Mex., assignor to Bernadine Hesch, Santa Fe, N. Mex.

Application July 23, 1951, Serial No. 238,138

11 Claims. (Cl. 74—424.5)

This invention comprises novel and useful improvements in a transmission differential assembly and more specifically pertains to a gearing assembly especially adapted for use in a differential type transmission and which shall be capable of a wide variety of speed ratios while maintaining a positive driving connection between the driving and driven elements of the assembly.

The principal object of this invention is to provide a gearing assembly capable of attaining a large number of speed ratios between the driving and driven members while maintaining a positive driving connection therebetween.

A still further object of the invention is to provide a gearing assembly in conformity with the preceding object which shall be capable of a differential action between a pair of driven shafts simultaneously operated from a single driving shaft, while offering a wide variety of speed ratios therein.

Yet another object of the invention is to provide a transmission differential gearing assembly wherein a minimum number of gears are employed and wherein the gearing arrangement is made as compact as possible.

These, together with various ancillary features and objects of the invention, which will later become apparent as the following description proceeds, are attained by the present invention, a preferred embodiment of which has been illustrated by way of example only, in the accompanying drawings, wherein.

Figure 1:
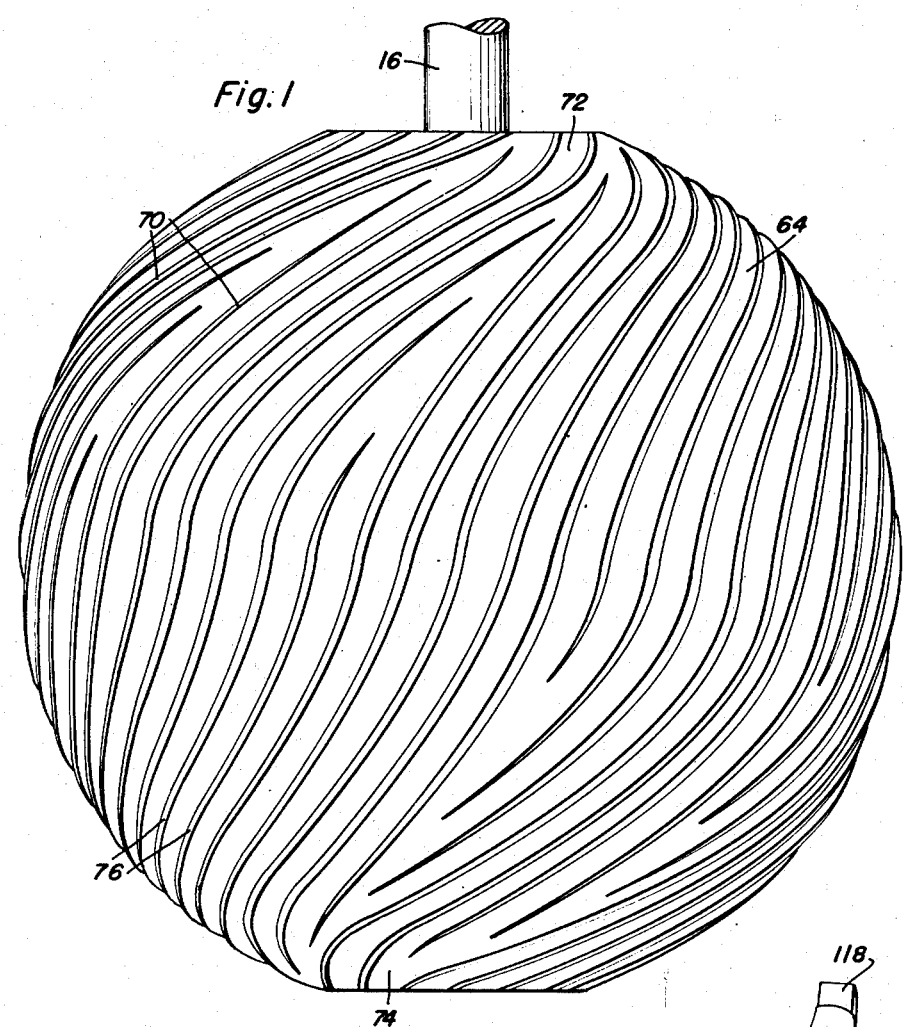
Figure 1 is a perspective view of a spherical gear constituting the driving gear of the assembly.

Reference is now made more specifically to the accompanying drawings, wherein like numerals designate similar parts throughout the various views, the numeral 10 designating generally any conventional form of housing or casing in which the differential gearing assembly forming the subject of this invention is enclosed, this housing being of any suitable design and may conveniently, as illustrated, be of a spherical shape in the interest of compactness.

Upon the exterior surface of the housing 10 there is provided an enlarged boss 12 in which is seated an anti-friction bearing assembly 14 of any conventional type, while a driving shaft 16 which is provided with a thrust collar 18 thereon is journaled in the bearing with a thrust collar bearing against the same, the end of the drive shaft extending into the gear casing 10. Conveniently, the drive shaft 16 may extend through a housing or bushing 20 having a flange 22 which is detachably secured to a complementary flange 24 of the boss 12 as by fastening bolts 26. The casing 10 may be provided with a suitable lubricant draining opening 28 which may be internally threaded to receive a closure plug, whereby lubricant may be introduced to or removed from the casing 10.

Upon opposite sides, and disposed in alignment with each other and upon an axis which is perpendicular to that of the drive shaft 16, the casing 10 is provided with a pair of laterally enlarged portions 30, each of which is provided with a chamber 32 extending laterally from the spherical chamber within the casing 10 and which enlargements are provided with aligned and oppositely extending tubular members 34 terminating in flanges 36 and having partitions 38. The partitions 38 and flanges 36 define internal chambers 40 in which are seated anti-friction bearings assemblies 42.

Detachably secured, as by fastening bolts 44, are a pair of tubular housings 46 having flanges 48 complementary to the flanges 36, and likewise provided with partitions 50 therein. The flange 48 and partition 50 of each of the tubular housings 46 defines a chamber 52 which is complementary to the chamber 40, and an integral annular thrust bearing 54 upon a driven shaft 56 is received in the chamber 52 and bears against the bearing assembly 42.

These driven shafts 56 are provided with fixedly secured hub portions 58 which form the axial portions of hemispherical body 60 constituting driven gears as set forth hereinafter.

In a similar manner, the driving shaft 16 is secured to the hub portion 62 of a spherical body 64 constituting a driving gear as set forth hereinafter.

It is deemed preferable, although the invention is not limited to this arrangement, to dispose the driving shaft 16 and the two oppositely disposed driven shafts 56 in the same horizontal plane. In any event, the spherical gear 64 is disposed at the center of the casing 10 and the two driven hemispherical gears 60 are disposed concentric therewith.

Figure 2:
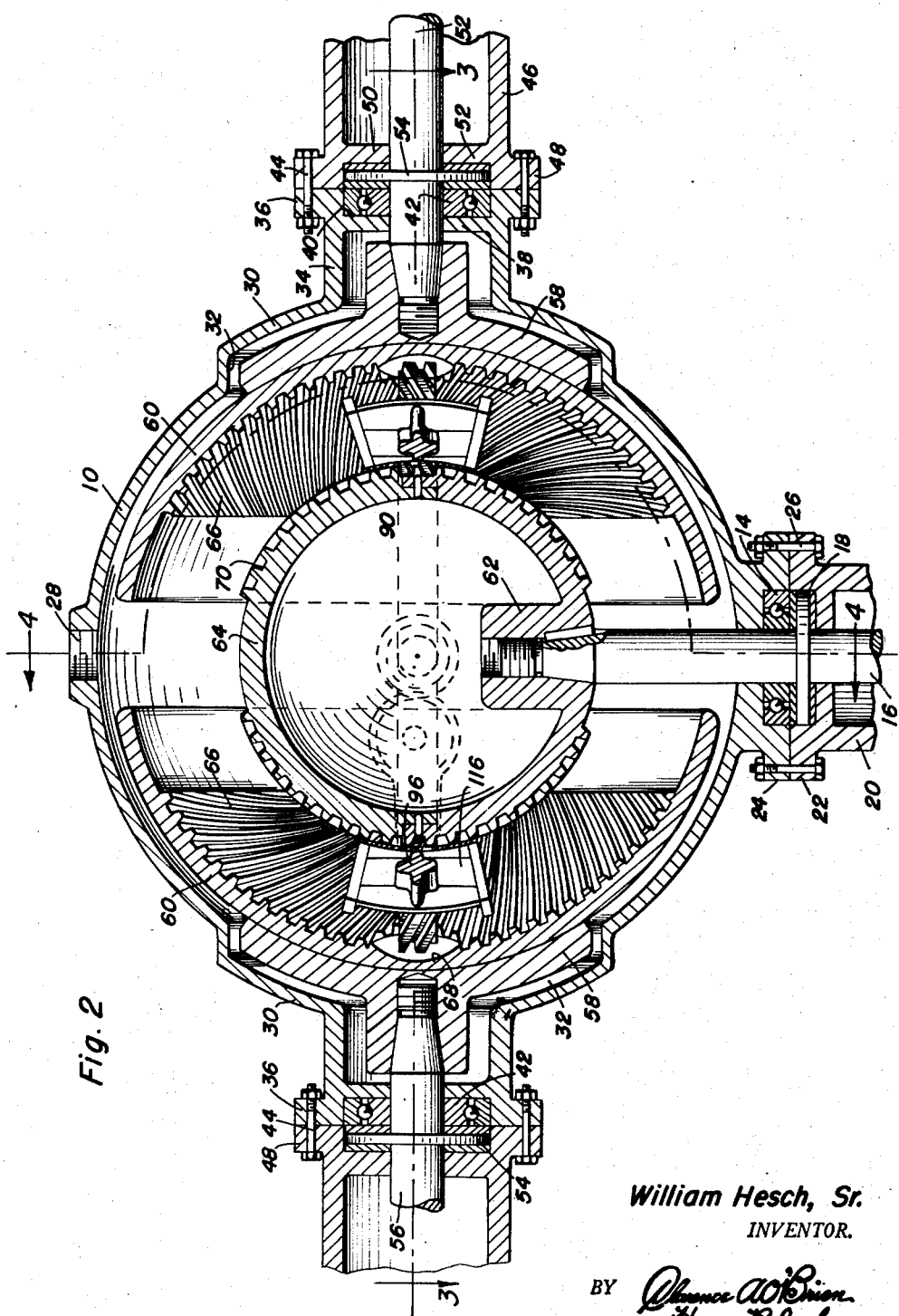
Figure 2 is a central transverse section view taken substantially upon the plane indicated by the section line 2—2 of Figure 4 and showing the compact differential gearing assembly forming the subject of this invention, the gearing being shown in its neutral or inoperative position.
Figure 3:
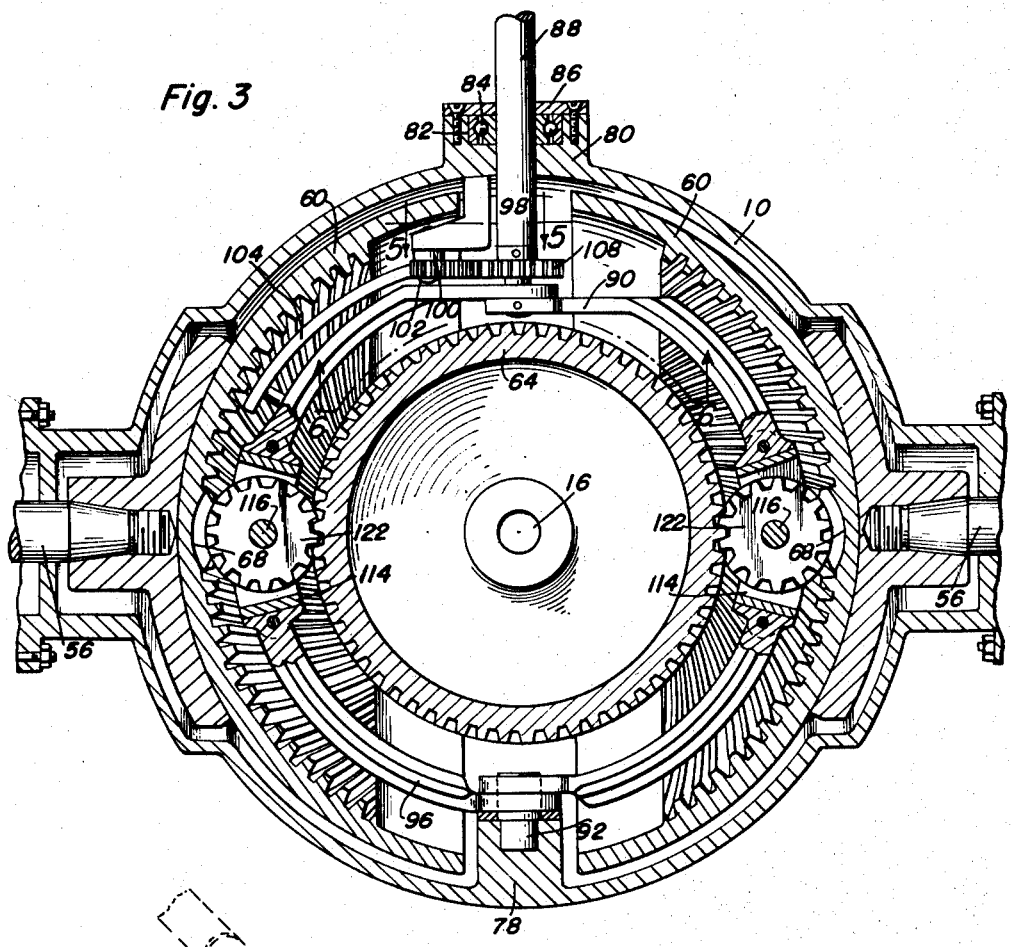
Figure 3 is a central longitudinal sectional view taken substantially upon the plane indicated by the section line 3—3 of Figure 2.

As will be readily apparent from Figures 2 and 3, the concave hemispherical inner surfaces of the gear bodies 60 are provided with spiral gear teeth 66. Conveniently, these gear teeth will extend over any desired portion of the area of the concave inner surface of the hemispherical bodies 60 and are of a spiral shape. At their midportions, that is, in the region adjacent to the axis of the shafts 56, the two bodies 60 are relieved or recessed as at 68 to provide an area devoid of teeth for a purpose to be set forth hereinafter.

The external surface of the spherical gear 64 is likewise provided with the system of spiral teeth 70 as shown more clearly in Figure 1.

The spherical gear 64 has a series of teeth extending from its north and south pole regions indicated respectively by the numerals 72 and 74, the teeth extending spirally between these poles and upon the circumference of the spherical gear. The teeth are so arranged so that they are at all points along their length substantially equidistantly spaced from each other so that an intermediate gear, to be hereinafter described, may operatively mesh and engage the teeth 70 at any point along the circumference of the same from the north to the south pole of the gear during its rotation. Since the maximum circumference of this gear is at its equatorial portion, it is obvious that more teeth can be disposed about its equator than can be disposed about parallel circles adjacent its poles. For that reason, as shown in Figure 1, there are provided certain intermediate teeth 76 which do not extend entirely from pole to pole, but are interposed between longer teeth. The arrangement is such that in one suitable example, there are provided about sixty-six equally spaced teeth along the equator of the spherical gear, while the polar areas are provided with about sixteen teeth thereabout. In any event, however, it is essential that in any circle extending about the spherical gear and in a plane parallel to the plane through the equator of the gear, that adjacent teeth shall be equidistantly spaced from each other.

The teeth 66 on the hemispherical gear 60 are similarly disposed so as to provide the same equidistant spaces between consecutive teeth. In addition, however, the teeth 66 upon opposite sides of the recessed bore portion 68 which is free of teeth are reversely spiraled for a purpose which will be subsequently apparent.

In order to transmit power and torque from the drive shaft 16 and the driving spherical gear 64 thereon to the driven shafts 56 and their driven hemispherical gears 60 thereon, an intermediate gear assembly is provided which is continually in mesh with the exterior surface of the spherical gear and with the interior surface of the hemispherical gears.

As will be more readily apparent from Figure 3, the casing 10 is provided with a pair of diametrically opposed bosses 78 and 80, the former extending internally from the smooth spherical exterior of the casing 10, and the latter protruding regularly outwardly therefrom to provide a bearing recess 82 having an anti-friction bearing assembly 84 therein which is retained as by a bearing cap or retainer plate 86. The axis of the bosses 78 and 80 is disposed in a plane which is perpendicular to that of the axis of the shafts 56 and of the axis of the shaft 16. It will thus be seen that the axes of the drive shaft 16, the driven shafts 56 and the bosses 78 and 80 are mutually perpendicular and are disposed diametrically of the spherical casing 10.

An adjusting shaft 88 is journaled in the boss 80, extending through the anti-friction bearing assembly 84 thereof, and into the interior of the gear casing 10 between the adjacent rims of the hemispherical gear 60 and into close proximity to the spherical surface of the gear 64. Upon its inward extremity, the shaft 88 has fixedly secured thereto an arcuate band 90 constituting one of a pair of carriers for the intermediate gear assembly, the other end of this band being mounted upon a stub axle 92 journaled in the opposite boss 78. Upon oscillation of the shaft 88, it will therefore be seen that the carrier member 90 will possess an arcuate movement about the center of the spherical gear 64 and between the complemental spherical surfaces of the gear 64 and one of the hemispherical gears 60. The second arcuate band 96 is provided disposed oppositely to and similar to the band 90, and which has its extremities journaled and freely rotatable upon the shaft 88 adjacent to the end of the band 90 thereon, and the stub axle 92 adjacent to that end of the band 90 which rests upon this axle.

The second arcuate carrier member 96 is disposed in a similar manner between the spherical gear 64 and the other of the hemispherical gears 60.

Fixedly secured to the interior surface of the spherical casing 10 adjacent to the adjusting shaft 88 is a mounting bracket 98. This mounting bracket is provided with a stub axle 100 upon which is freely rotatably journaled a gear 102 forming the hub portion of a curved lever 104.

Figure 5:
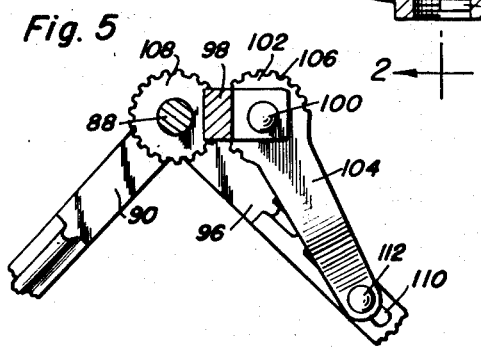
Figure 5 is a fragmentary detail view of a part of a synchronizing and equalizing mechanism for operating the adjustable intermediate gears of the invention, taken substantially upon the plane indicated by the section line 5—5 of Figure 3.

As shown more clearly in Figure 5, the hub portion 102 is provided with external gear teeth 106 extending throughout any desired portion of its circumference, which teeth are continuously in mesh with a complementary gear 108 which is fixedly secured to the adjusting shaft 88.

Figure 6:
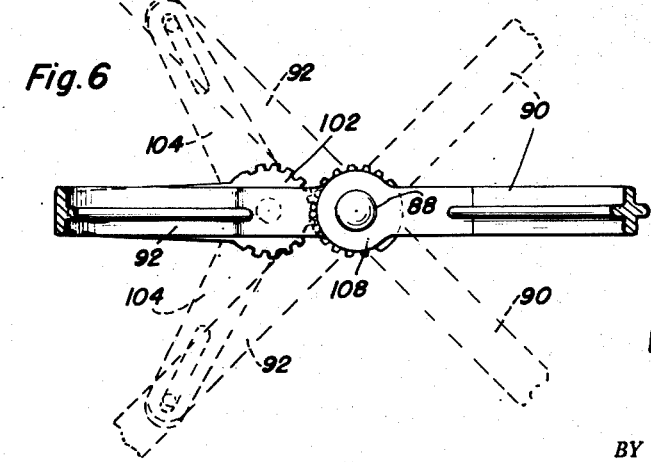
Figure 6 is a detail sectional view taken substantially upon the plane indicated by the section line 6—6 of Figure 3.

As will be now more readily apparent from Figure 5 and from the somewhat diagrammatic showing of Figure 6, the carrier member 96 is provided with elongated slot 110 in which is slidably received a pin 112 carried by the lever 104.

It will therefore be apparent that as the shaft 86 is oscillated, it will positively and directly cause oscillatory motion of the carrier member 90, and through the gear connection 108, 102 and the connecting lever 104, pin 112 and slot 110, will cause simultaneous oscillatory motion of the carrier section 96. Thus, the movement of the shaft 88 will simultaneously cause the two carrier sections 90 and 96 to move toward and from each other.

Mounted upon these carrier sections in a manner set forth hereinafter are intermediate gears which are continuously in mesh with the spherical gear 64 and the pair of complementary hemispherical driven gears.

In a manner to be made subsequently apparent, the adjustment of the carrier members 96 and 90 will move the intermediate gears between the north and south poles of the spherical driving gear, and toward and/or from the axis of rotation of the hemispherical driven gears and upon either side of the same. This movement will thus impart varying gear ratios between the driving gear 64 and the driven gear 60 while maintaining at all times, by virtue of the constant of the gear teeth, a positive mechanical connection between the driving and driven shafts.

Figure 4:
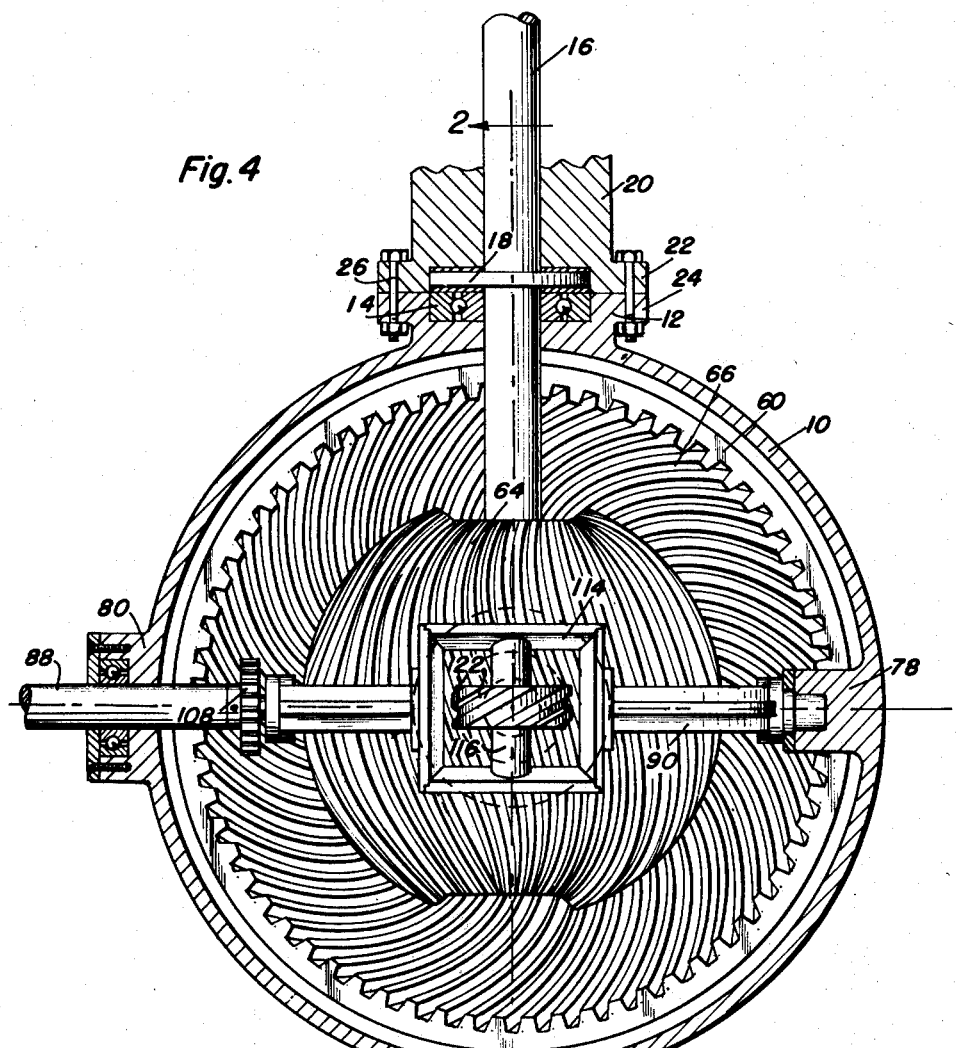
Figure 4 is a sectional view taken substantially upon the plane indicated by the section line 4—4 of Figure 2 and showing more particularly the arrangement of the driving and driven gears together with the intermediate gears disposed therebetween in neutral or inoperative position of the assembly.

As will be apparent from Figure 4, in conjunction with Figure 3, each of the carriers 90 and 96, is provided at its midportion with a rectangular hollow frame 114, which overlies and is movable over the equatorial section of the spherical gear 64. Secured in this frame is an arcuate axle 16, see Figures 8 and 7, whose opposite extremities 118 are non-rotatably secured in opposite sides of the frame 114. The arcuate axle 116 lies upon the arm of the carrier 90 or 96 with which the same is associated.

Journaled upon the axle 116 and within the rectangular frame 114 in each of the carriers, as by an anti-friction bearing assembly 120, is an intermediate gear 122 which is yieldingly retained at the midportion of the axle 116 as by compression springs 124 in opposite sides of the gear and which springs abut against the adjacent walls of the rectangular frame. By this means, the intermediate gears 122 are resiliently held at the midportion of the carrier members and thus are yieldingly held in a position for equatorial movement about the spherical gear upon oscillation of their carriers as set forth hereinbefore.

From the foregoing, it will now be apparent that rotation of the driving spherical gear 64 is imparted to the pair of hemispherical driven gears 60 through the pair of intermediate or idler gears 122. These gears are provided with spiral or helical threads for driving engagement with the corresponding threads of the gears 64 and 60. From the foregoing, it is thought that the operation of the device will now be readily apparent. When the intermediate gear assembly is disposed in the position shown in Figures 2 and 3, it is evident that although the intermediate gears are continuously rotated by the spherical gear 64, they do not impart motion to the gears 60 since they are in substantial registry with the relieved or recessed portions 68 previously mentioned. However, upon oscillation of the adjusting shaft 88, the intermediate gears are moved so as to engage either of the reversely threaded portions of the gears 60. It will be noted that the intermediate gears simultaneously engage the similarly threaded portion of the two gears 60 for driving the pair of driven gears 56.

The reversely threaded portions of each of the gears 60 enables either a direct or a reverse drive to be established between the spherical gear 64 and the driven gears, depending upon which side the relieved portions of the driven gears are engaged by the intermediate gears.

Regardless of the direction of rotation imparted to the driven shafts, it will now be apparent that various speed ratios may be given thereto and to both of the driven shafts 56 simultaneously by the above described adjusting and synchronizing mechanism. Immediately after the intermediate gears leave the neutral position in Figures 3 and 4, it will be apparent that the maximum gear ratio is obtained between the driving gear 64 and the intermediate gears 122 since the intermediate gears engage the driving gear upon the equator of the driving gear. At the same time, the maximum driving ratio is established between the intermediate gears and the driven gears 60, since the intermediate gears engage the latter adjacent the most central or axial portion of the driven gears. As the intermediate gears are moved arcuately toward the poles of the driving gear, it is evident that this gear ratio is lessened until at the poles the minimum ratio is established.

Figure 7:
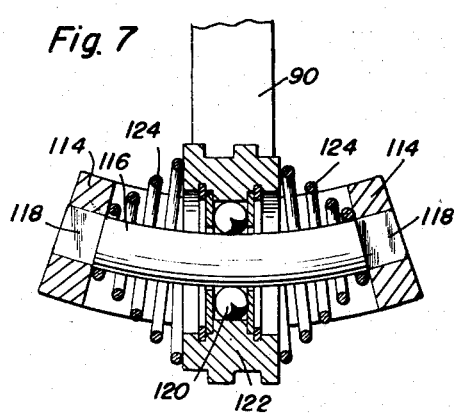
Figure 7 is a fragmentary detail view upon an enlarged scale of a portion of the invention.
Figure 8:
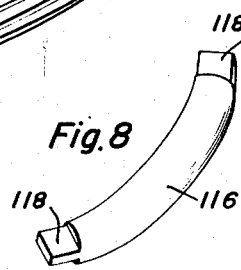
Figure 8 is a perspective view of an element of the assembly.

It should be observed that when the above described and illustrated mechanism is utilized in a differential assembly, the relative increase in speed of one of the driven shafts 56 compared to the other will tend to produce a relatively greater torque upon the corresponding intermediate gear engaging the driven gear 60 of that shaft, which torque will cause a sidewise displacement of the gear upon its axle 116, see Figure 7, until the gear is disposed in the relieved portion 68, thereby permitting that shaft to rotate until the speeds of rotation of the two shafts 56 are again equalized. This construction is, of course, extremely advantageous as when the device is utilized as a differential mechanism of an automotive vehicle or the like.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A gearing assembly comprising driving and driven shafts, a spherical gear on the driving shaft and a hemispherical gear on the driven shaft, an intermediate gear engaging and interposed between the above mentioned gears, means for moving said intermediate gear relative to said driving and driven gears upon an arc which is perpendicular to the axis of rotation of said driving gear.

2. A gearing assembly comprising driving and driven shafts, a spherical gear on the driving shaft and a hemispherical gear on the driven shaft, an intermediate gear engaging and interposed between the above mentioned gears, means for moving said intermediate gear relative to said driving and driven gears upon an arc which is perpendicular to the axis of rotation of said driving gear, said driven gear being rotatable upon an axis perpendicular to that of the driving gear and to that of the arcuate motion of the intermediate gear.

3. The combination of claim 2 wherein said spherical and hemispherical gears have equidistantly spaced teeth thereon whereby the arcuate movement of the intermediate gear will establish various speed ratios between the driving and driven shafts.

4. A transmission differential assembly comprising a driving shaft having a spherical driving gear thereon, a pair of aligned driven shafts on opposite sides of said spherical gear and perpendicular to said driving gear, a hemispherical driven gear on each driven gear disposed concentric to said spherical gear, an idler gear assembly operatively interposed between said spherical and hemispherical gears.

5. A transmission differential assembly comprising a driving shaft having a spherical driving gear thereon, a pair of aligned driven shafts on opposite sides of said spherical gear and perpendicular to said driving gear, a hemispherical driven gear on each driven gear disposed concentric to said spherical gear, an idler gear assembly operatively interposed between said spherical and hemispherical gears, said spherical and hemispherical gears having spiral teeth extending from pole to pole of said gears, said teeth being equidistantly spaced throughout their lengths.

6. The combination of claim 5 wherein said idler gear assembly comprises a pair of idler gears, said idler gears each engaging a hemispherical gear and said spherical gear, means mounting each idler gear for movement about an axis perpendicular to that of the driving and driven shafts and in an arcuate path on the surface of the spherical gear from pole to pole thereof for varying the ratio between the driving and driven shafts.

7. The combination of claim 6 including connecting means for causing simultaneous and equal movement of said mounting means.

8. A transmission assembly comprising a driving shaft having a spherical driving gear thereon, a pair of aligned driven shafts perpendicular to said driving shaft and having hemispherical driven gears complementary to said driving gear, a pair of arcuate carriers interposed between the driving and driven gears and oscillatable upon an axis which is perpendicular to those of the driving and driven shafts, intermediate gears journaled on said carriers and engaging said driving and driven gears, means for simultaneously imparting oppositely directed oscillatory motion to said carrier.

9. The combination of claim 8 wherein said driven gears have central relieved toothless portions and reversely threaded portions on opposite sides of said relieved portions.

10. The combination of claim 8 wherein said carriers have open frames at their midportions, said intermediate gears being rotatably journaled and positioned in said open frames.

11. The combination of claim 8 wherein said carriers have open frames at their midportions, said intermediate gears being rotatably journaled and positioned in said open frames, resilient means yieldingly urging said intermediate gears centrally of said open frames.

WILLIAM HESCH, Sr.

REFERENCES CITED

The following references are of record in the file of this patent:

UNITED STATES PATENTS

| Number | Name | Date |
|---|---|---|
| 1,393,973 | Ross | Oct. 18, 1921 |
| 1,393,974 | Ross | Oct. 18, 1921 |